2,838,261
JETTISONABLE FUEL TANK CONSTRUCTION

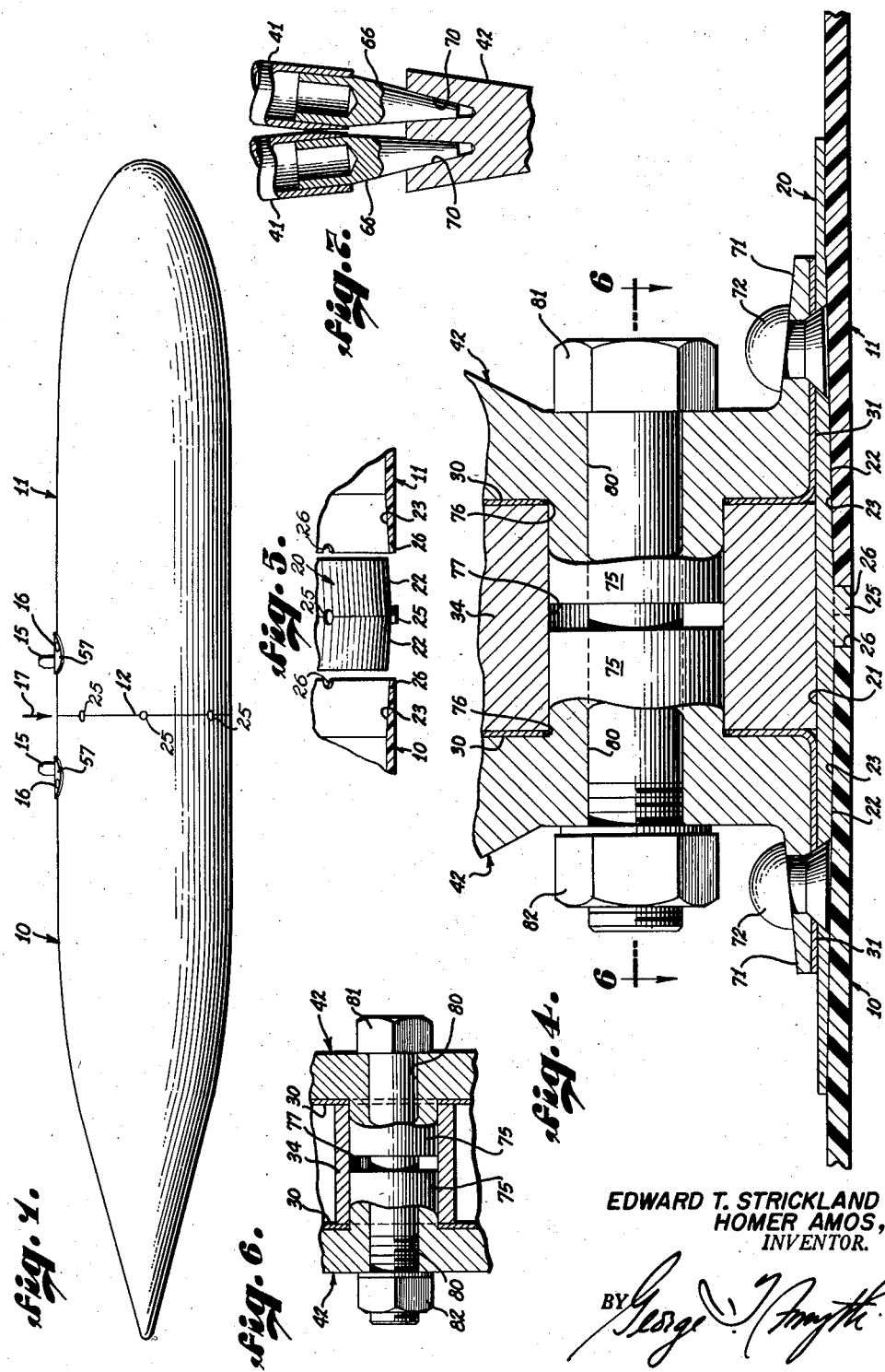

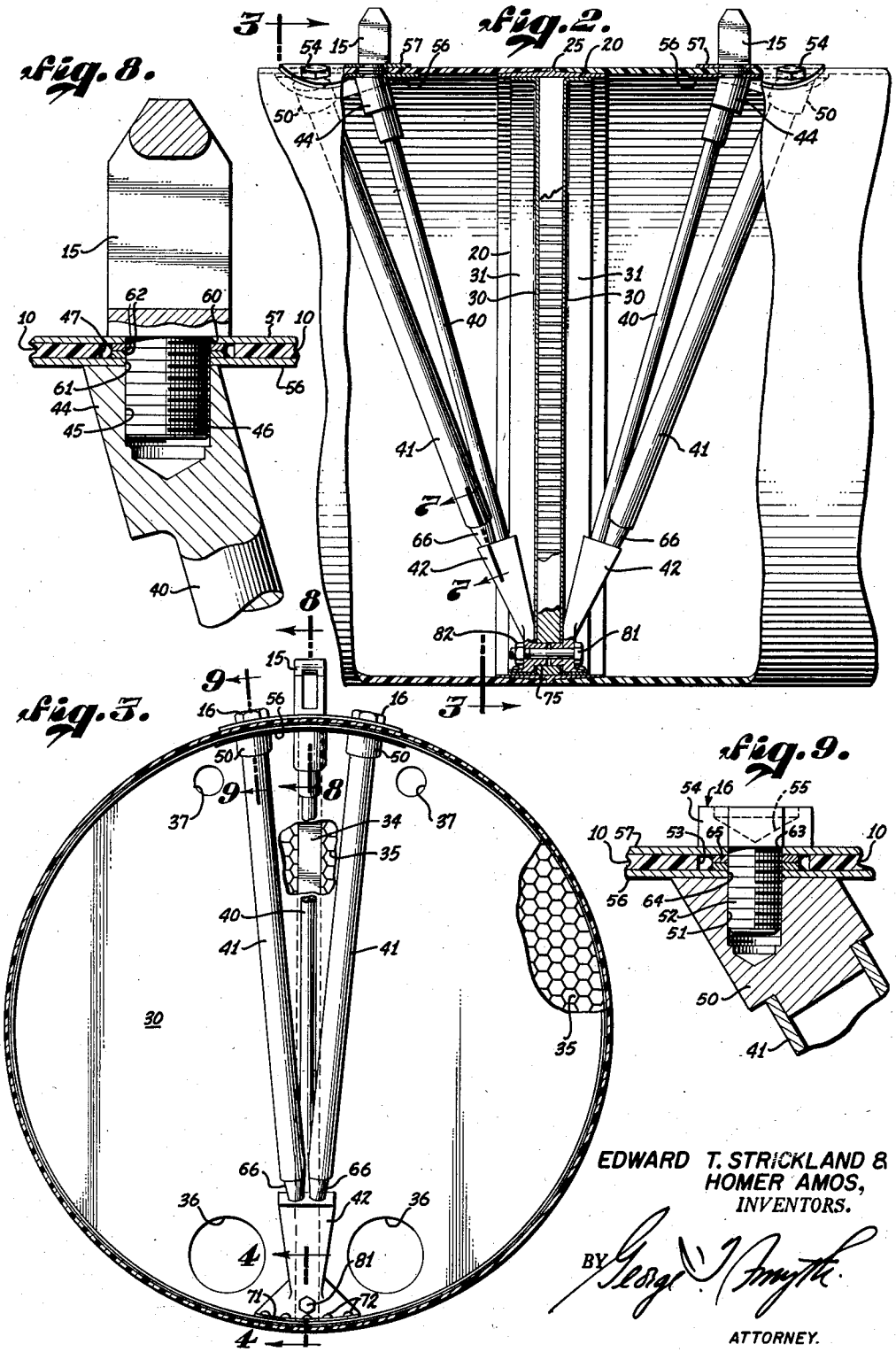

Homer Amos, Manhattan Beach, and Edward T. Strickland, Playa del Rey, Calif., assignors to Pastushin Aviation Corporation, Los Angeles, Calif., a corporation Application August 31, 1954, Serial No. 453,204

12 Claims. (Cl. 244—135)

This invention relates to a jettisonable fuel tank that is adapted for releasable attachment to an aircraft and to receive ejective force for abrupt separation from the aircraft. Such a disposable fuel tank has mounting means in the form of loops or shackles at longitudinally spaced points on the top side of the tank for releasable engagement by means on the aircraft and, in addition, the fuel tank is usually equipped with pairs of sway-brace pads on its top side for pressure contact with corresponding sway braces on the aircraft. When the tank is released, the ejective force is applied in a region between the points of attachment to the aircraft. The ejective force may be created by the detonation of an explosive charge against the inner end of an ejection piston, the outer end of the piston being in abutment against the tank.

A jettisonable fuel tank of this character must be relatively light to add as little weight as possible to the fuel load and should be of relatively inexpensive construction since it is discarded as soon as it is empty. These considerations, taken alone, would lead to a tank structure consisting of a simple light sheet shell or skin. It is of paramount importance, however, that the tank withstand the stresses incurred in flight, these stresses being of high magnitude. The stresses are necessarily concentrated since they are transmitted to the tank at the points of releasable attachment to the aircraft, and at the points where pressure is applied to the sway brace pads.

Because of the stress concentrations, a tank consisting solely of a shell or skin without reinforcement structure cannot be used. A simple shell would tend to tear at the points of releasable attachment to the aircraft when the aircraft is rapidly accelerated and decelerated as well as when the aircraft makes abrupt changes in direction. When the ejective force is applied to a simple shell, moreover, the shell tends to rupture or crumple locally instead of being thrown bodily away from the aircraft.

It has been found, therefore, that reinforcement structure is necessary to withstand these forces incurred both in flight and in the ejection operation. Mere local reinforcement at the points of stress application or transmission is not enough. The required degrees of reliability and safety can be achieved only if the reinforcement structure is of such character as to distribute the incurred stresses widely both longitudinally and circumferentially of the tank shell.

The present invention provides an internal circumferential reinforcement for the skin or shell of the tank, which reinforcement is located in the region where the ejective force is applied against the tank. The mounting means or shackles for releasable attachment of the tank to the aircraft are spaced apart longitudinally of the tank and lie on opposite sides of the internal circumferential reinforcement. The pairs of sway brace pads for cooperation with the sway braces of the aircraft are also spaced apart longitudinally of the tank on opposite sides of the internal circumferential reinforcement.

An important feature of the invention resides in the manner in which the internal circumferential reinforcement is structurally related both to the mounting shackles and the sway brace pads for the required distribution of stresses. In this regard, the invention is characterized by the provision of internal diagonal tension members for connecting the shackles with the internal circumferential reinforcement and by the further provision of internal diagonal compression members for connecting the sway brace pads with the internal circumferential reinforcement.

In various practices of the invention, the shell or skin of the tank with which the internal reinforcement structure cooperates may be made of sheets of various materials, including relatively light thin metal sheet. An important advantage of the internal reinforcement structure provided by the invention is that it makes it possible to use a suitable plastic material instead of sheet metal for the shell of the tank. The tank shell may be made, for example, of a polyester resin reinforced by glass fibers embedded therein.

A tank made of plastic material is desirable for military use, not only because it is relatively inexpensive and conserves strategic material, but also because it breaks up when dropped to the ground in the course of flight and has relatively little salvage value to the enemy. Such a tank has been selected by way of example for the purpose of the present disclosure and will provide adequate guidance for those skilled in the art who may have occasion to embody the underlying principles in other specific tank constructions.

In the preferred practice of the invention for the construction of a tank having a shell made of plastic material, the internal reinforcement structure includes an inner circumferential ring that serves to connect together the shells of two adjacent tank sections. This inner ring is part of a bulkhead structure or assembly in the region where the ejective force is applied to the tank and preferably the ring is reinforced by a diametrical compression member positioned for alignment with the ejective force. In the preferred construction, the bulkhead assembly further includes two spaced transverse sheets of material that span the inner ring and are connected thereto. A suitable honey-comb structure made of exceedingly light sheet material and formed with hexagonal cells is sandwiched between the two sheets to cooperate therewith to form a relatively rigid transverse bulkhead wall.

A further feature of the preferred practice of the invention is the concept of employing this bulkhead assembly, including the inner circumferential ring, to interconnect the two shell sections that meet at the ring. For this purpose, the outer circumferential surface of the inner ring is tapered in opposite directions to provide two oppositely inclined circumferential surfaces which telescope into the ends of the two shell sections, the inner surface of the shell being tapered to conform to the oppositely tapered surfaces of the ring. This construction makes it possible to dimension the inner ring to fit into the two tank shells in a wedging manner to place the two shell sections under permanent circumferential tension in the region of the inner ring and the inner ring itself under permanent radial compression. An important advantage of such a pre-stressed tank construction is that the tight fit of the two shell sections over the inner reinforcement ring provides the degree of pressure between the coacting surfaces that is required for the curing of bonding material to unite the two plastic shells to the interconnecting ring.

A further feature of the preferred practice of the invention is the provision of radial projections on the inner ring for cooperation with the two shell sections in the assembly of the tank. Preferably the radal projections on the ring are lugs and the ends of the two shell sections are recessed for engagement with the lugs. Thus the radial projections may serve not only to center the ring relative to the two shell sections but also cooperates with the shell recesses to insure that the two shells will be correctly oriented on their axes with respect to the ring and with respect to each other. Thus the fittings on the two shell sections including the shackels and pressure pads will be positioned in correct longitudinal alignment. As will be explained, the provision for correct orientation of the two tank shells relative to each other makes it possible to mount the diagonal tension and compression means on the bulkhead assembly apart from the two shells with the assurance that they will be brought to correct positions inside the two shells for final assembly thereto.

The various features and advantages of the invention will be apparent in the following detailed description considered with the accompanying drawings.

In the drawings, which are to be regarded as merely illustrative:

Figure 1 is a side elevation of a selected embodiment of the invention in the form of a jettisonable plastic fuel tank;

Figure 2 is a fragmentary side elevational view on an enlarged scale showing a portion of the tank in the region of the bulkhead assembly, parts of the tank being broken away to show the internal structure;

Figure 3 is a transverse section taken as indicated by the line 3—3 of Figure 2;

Figure 4 is a greatly enlarged fragmentary section taken as indicated by the line 4—4 of Figure 3;

Figure 5 is a fragmentary view partly in section and partly in side elevation showing the inner reinforcement ring with the two shell sections positioned relative thereto for telescoping onto the ring;

Figure 6 is a horizontal section on a reduced scale taken as indicated by the line 6—6 of Figure 4;

Figure 7 is a fragmentary section taken as indicated by the line 7—7 of Figure 2;

Figure 8 is a fragmentary section taken as indicated by the line 8—8 of Figure 3 to show the structure associated with one of the tank shackles; and Figure 9 is an enlarged fragmentary section taken as indicated by the line 9—9 of Figure 3 showing the structure associated with one of the sway brace pads.

The auxiliary fuel tank shown in Figure 1 to exemplify the invention is made in two sections and comprises two plastic tank shells that meet at a transverse parting line 12 and that are both interconnected and reinforced by internal structure. Preferably the two tank shells 10 and 11 are made of a polyester resin reinforced by glass fibers. The fuel tank is provided with mounting means in the form of a pair of longitudinally spaced shackles 15 for engagement by suitable releasable means on an aircraft. Usually the releasable means comprises hook means in a pylon on the underside of the aircraft, which hook means may be released by remote control to jettison the fuel tank. Near each of the shackles 15 is a pair of sway brace pads 16 which are adapted for engagement by the aircraft in a well-known manner to stabilize the fuel tank against lateral sway. Ejective force is exerted against the fuel tank in the region between the two shackles 15 when the two shackles are released to permit the fuel tank to be jettisoned. This ejective force, which may be exerted by a suitable piston on the aircraft in response to the detonation of an explosive charge, is directed against the fuel tank in the region of the parting line 12 as indicated by the arrow 17 in Figure 1.

The internal reinforcement that serves both to interconnect the two shells 10 and 11 and to reinforce the two shells comprises a bulkhead structure or assembly which includes an internal circumferential ring 20. As best shown in Figure 4, the ring 20 is of tapered cross-sectional configuration with an inner cylindrical surface 21 and two oppositely inclined outer conically curved surfaces 22. The two adjacent ends of the two tank shells 10 and 11 are internally tapered to provide conically-curved surfaces 23 conforming to the corresponding conically-curved surfaces 22 of the ring.

It is contemplated that the conically-curved surfaces 22 of the ring and the conically-curved surfaces 23 of the two tank shells will be dimensioned for forced fit, so that the two tank shells may be forced onto the ring 20 with a wedging action on the part of the ring that will result in a substantial degree of radial compression of the ring. Suitable bonding material in the form of an adhesive plastic material is interposed between the conically-curved surfaces 22 and 23 with the described wedging action providing the pressure required for effective and fluid-tight curing of the bonding material.

Figure 5 shows how the two shells 10 and 11 may be positioned relative to the internal ring 20 in preparation for forcing the two shells longitudinally onto the ring. A certain problem arises here inasmuch as it is essential that the two tank shells meet at the midpoint of the ring 20. Some means must be provided to keep each of the shells from advancing too far onto the ring. A feature of the present practice of the invention is the provision of a plurality of small radial lugs 25 spaced apart circumferentially along the circumferential center line of the ring 20 and the further provision of corresponding recesses 26 in the rim edges of the two tank shells 10 and 11 for engagement by the lugs. The lugs 25 are preferably of circular configuration and each of the recesses 26 is of semi-circular configuration so that a pair of the two recesses 26 encloses each of the lugs 25 in the assembly tank. As shown in Figure 4, each of the lugs 25 is dimensioned to be flush with the peripheral surface of the assembled tank. Whichever of the two tank shells first engages the internal ring 20 by means of the lugs, stops midway of the ring and then forces the internal ring into the other shell. Preferably the lugs 25 are distributed circumferentially in a non-uniform manner that will permit the two shells 10 and 11 to engage the lugs at only one orientation of each tank shell relative to the other about their common longitudinal axis. For example, the opening between the upper lug 25 and the intermediate lug 25 in Figure 1 is different from the spacing between the intermediate lug 25 and the lower lug 25. This provision insures that the two tank shells 10 and 11 will be correctly rotated relative to each other in their final assembled position to place the shackles 15, sway brace pads 16 and other fittings on the two shells in correct longitudinal alignment.

The bulkhead structure includes two transverse sheets 30 that span the interior of the completed tank in peripheral engagement with the internal ring 20. Each of the two sheets 30 is formed with a cylindrical peripheral flange 31. The two sheets 30 may be made of thin aluminum, for example, and may be bonded by their flanges 31 to the internal ring 20 in any suitable manner.

Sandwiched between the two sheets 30 along a vertical diameter of the tank is a compression member in the form of a metal bar 34 of rectangular cross-sectional configuration. This bar is aligned with the direction of the ejective force represented by the arrow 17 in Figure 1 and acts in compression to transmit the ejective force across the diameter of the internal ring 20 for distribution of stresses from the ring to the skin or shell of the tank. Also sandwiched between the two sheets 30 on opposite sides of the vertical metal bar 34 are two sections of a honeycomb structure 35 having hexagonal cells. This honeycomb structure, which is well-known, may be made of any suitable relatively thin sheet material with the sheet material of the honeycomb aligned longitudinally of the tank. Preferably the sheet material of the honeycomb structure comprises thin aluminum. Suitable lower openings 36 and upper smaller openings 37 shown in Figure 3 are provided in the metal sheets 30 and in the honeycomb structure 35 to provide fluid communication through the bulkhead structure.

The internal reinforcement structure of the tank also includes means at the two shackles 15 and the four sway brace pads 16 to distribute the stresses incurred during flight. A feature of the invention in this regard is the concept of uniting each of the two shackles 15 with the internal reinforcement structure by suitable tension means and of uniting the various sway brace pads 16 with the internal reinforcement structure by suitable compression means. Thus the tension and compression means associated with each of the two tank shells 10 and 11 are interconnected by the internal reinforcement structure. In addition, the tension and compression means are connected to the skin or shell of the tank.

In the particular construction shown in the drawings, a tension means in the form of a metal rod 40 is connected with each of the two shackles 15, and a compression means in the form of a pair of metal tubes 41 is connected to the corresponding pair of sway brace pads 16. Preferably each metal rod 40 is connected to the two corresponding metal tubes to form an inverted tripod and for this purpose, the three members converge at what may be termed a tripod fitting 42.

As best shown in Figure 8, each of the metal rods 40 has an enlarged upper end 44 at the top of the tank and this upper end has a threaded bore 45. The threaded shank 46 of the corresponding shackle 15 extends through an aperture 47 in the tank shell and is screwed into the threaded bore 45. The lower end of each of the metal rods extends into the corresponding tripod fitting 42 and is suitably bonded thereto.

As best shown in Figure 9, a suitable metal fitting is mounted in the upper end of each of the two metal tubes 41 and each of these metal fittings is provided with a threaded bore 51. The threaded shank 52 of the corresponding sway brace pad 16 extends through an aperture 53 in the tank shell and is screwed into the threaded bore 51. Each of the sway brace pads 16 is in the form of a screw having a hexagonal head 54, the hexagonal head being formed with a conical socket 55 for cooperative contact with the corresponding sway brace means on the aircraft.

The enlarged upper end 44 of each of the metal rods 40 and the two upper end fittings 50 of the two corresponding tubes 41 are interconnected by an inner metal plate 56 that is furnace welded thereto and is also suitably bonded to the inner surface of the corresponding tank shell. In like manner, each of the shackles 15 and the two corresponding sway brace pads 16 are interconnected by an outer metal plate 57 by virtue of the fact that each of these fittings extends through an aperture in the outer plate. Thus Figure 8 shows the shank 46 of a shackle 15 extending through an aperture 60 in the outer metal plate 57 and through a corresponding aperture 61 in the inner metal plate 56. Preferably a pair of spacer washers 62 surround the shackle shank 46, the two spacer washers being welded to the inner and outer plates 56 and 57 respectively. In like manner, as shown in Figure 9, the shank 52 of each of the sway brace pads 16 extends through an aperture 63 in the outer metal plate 57 and through a corresponding aperture 64 in the inner metal plate 56. Here again, preferably the shank 52 is surrounded by a pair of spacer washers 65 which are welded respectively to the inner and outer metal plates 57 and 56. As shown in Figure 7, the lower end of each of the tubes 41 is provided with a conical fitting 66 and the corresponding tripod fitting 42 is provided with a pair of conical bores 70 to seat the conical fitting 66.

Each of the two tripod fittings 42 is formed with an arcuate flange 71 and a series of rivets 72 anchor each of the arcuate flanges to internal ring 20. As shown in Figure 4, each of the rivets 72 extends through the peripheral flange 31 of the corresponding transverse sheet 30. Each of the two tripod fittings 42 is also formed with a cylindrical boss 75 and the two cylindrical bosses are aligned with each other and extend into the bulkhead structure as shown in Figure 4. Thus each of the bosses 75 extends through an aperature 76 in the corresponding transverse sheet 30 and into a corresponding bore 77 that extends through the vertical metal bar 34. Each of the tripod fittings 42 has a bore 80 therethrough coaxially of the corresponding boss 75 and a suitable bolt 81 carrying a nut 82 extends through the two bores 80 to interconnect the two tripod fittings 42 from opposite sides of the bulkhead structure.

In preparation for final assembly of the tank, the bulkhead structure is completed by attaching the two transverse sheets 30 to the internal ring 20 with both the vertical bar 34 and the honeycomb structure 35 sandwiched between the two sheets. The tension rod 40 and the corresponding pair of compression tubes 41 are then mounted on each of the tripod fittings 42 with the upper ends of the tension member and the two compression tubes fixedly inter-connected by the corresponding inner metal plate 56. Thereafter, each of the two tripod fittings 42 is riveted to the internal ring 20 with the two bosses 75 of the tripod fittings extending into the metal bar 34. The bolt 81 is then inserted to tie the two tripod fittings together through the bulkhead.

Suitable adhesive bonding material is spread over the upper surface of each of the inner plates 56 for the purpose of subsequently bonding the inner plates to the corresponding plastic shells of the tank and then the two tank shells 10 and 11 are positioned relative to each other as shown in Figure 5 in preparation for forcing the two tank shells onto the internal ring 22. Plastic bonding material is applied to the conically-curved surfaces 22 and 23. Longitudinal force is then applied to force the tank shells 10 and 11 onto the internal rings 20 and to cause the two tank shells to meet at the parting line 12.

The interconnected tripod fittings 42 hold the tension members 40 and the compression members 41 rigidly in their correct positions and with the rim recesses 26 of the two tank shells cooperating with the radial lugs 25 of the internal ring to assure correct rotational orientation of the two shells relative to each other, the ultimate positions of the tension rods 40 and compression rods 41 are correct for connection with the corresponding shackles 15 and with the sway brace pads 16. The two outer plates 57 are then coated with plastic bonding material on their undersurfaces and are placed on the outer surfaces of the two corresponding tank shells. The two shackles 15 and the four sway brace pads 16 are then screwed into place. Heat is then applied to cure the adhesive material for bonding the inner plates 56 and the outer plates 57 to the plastic shells 10 and 11 as well as for bonding the two shells to the internal ring 20.

The manner in which the various structural parts serve their purpose may be readily understood from the foregoing description. The honeycomb structure 35 together with the vertical metal bar 34 lend rigidity to keep the two thin sheets 30 from buckling thus providing a relatively light bulkhead structure having adequate strength for its purpose. In the course of flight with auxiliary tank carried by the shackles 15, the concentrated stresses at the shackles are transmitted to the tension rods 40 to place the tension rods in tension and are transmitted by the tension rods to the two tripod fittings 42. In like manner, the stresses concentrated at the sway brace pads 16 are transmitted to the tubes 41 to place the tubes in compression and are transmitted by the tubes to the tripod fittings 42. Thus the tension of the tension rods 40 opposes the compression of the tubes 41. It is readily apparent that this arrangement causes all the concentrated stresses to be adquately distributed to the tank shell both circumferentially and longitudinally.

When the tank is ultimately jettisoned, the ejective force represented by the arrow 17 in Figure 1 is transmitted to the vertical metal bar 34 endwise thereof and is transmitted by the metal bar to the two tripod fittinps 42 at the bottom of the tank. The two tripod members and the bulk head web cooperate with the internal ring 20 to distribute the ejective force to the complete circumference of the two shells. It is apparent that this arrangement will cause the tank to respond to the ejective force by bodily movement with no possibility of the tank merely collapsing in response to the ejective force.

The selected embodiment of the invention has been described herein in specific detail by way of example and to illustrate the principles involved. It will be apparent to those skilled in the art that various modifications be made within the spirit and scope of the appended claims.

We claim:

1. In an auxiliary fuel tank for an aircraft, the combination of: a tank shell; an inner circumferential structure reinforcing said shell, a shackle on said shell spaced longitudinally from said reinforcing structure for attaching the tank; a pair of circumferentially spaced sway brace pads on said shell spaced longitudinally from both said reinforcement structure and said shackle; means inside said shell interconnecting said structure and said shackle in tension; and means inside said shell interconnecting said reinforcement structure and said sway brace pads in compression.

2. An auxiliary fuel tank as set forth in claim 1 in which said tension means and said compression means converge and are interconnected in the region of said reinforcing structure.

3. In a jettisonable fuel tank for releasable attachment to an aircraft by means including spaced mounting means on the tank, and for separation from the aircraft by ejective force applied to the tank intermediate said mounting means, the combination of: a tank shell; an internal circumferential reinforcement for said shell; two pairs of sway brace pads spaced from said internal reinforcement in opposite directions longitudinally of the tank; two mounting means on the tank for releasable attachment of the tank, said two mounting means being spaced in opposite directions from said internal reinforcement longitudinally of the tank at positions intermediate the internal reinforcement and said sway brace pads; two oppositely inclined tension means connecting two said mounting means respectively with said internal reinforcement; and two oppositely inclined compression means connecting each of said pairs of sway brace pads with said internal reinforcement.

4. A jettisonable fuel tank as set forth in claim 3 in which the tension means and the corresponding compression means on each side of said internal reinforcement converge and are interconnected in the region of the internal reinforcement.

5. A jettisonable fuel tank as set forth in claim 3 in which said internal reinforcement is positioned in the region of application of the ejective force.

6. A jettisonable fuel tank as set forth in claim 5 in which said internal reinforcement includes a diametrical member to receive the ejective force.

7. A jettisonable fuel tank as set forth in claim 6 in which said diametrical member is connected to two tension means.

8. In a jettisonable fuel tank having a shell with two shackles thereon for attachment to an aircraft and two pairs of sway brace pads thereon for cooperation with sway braces on the aircraft, the combination therewith of internal reinforcement for distribution of the stresses incurred in carrying and ejecting the tank, said internal reinforcement comprising: a bulkhead inside the tank to retard the surge of liquid therein, said bulkhead being positioned centrally of said two shackles to receive ejective force; means in tension extending from each of said shackles to said bulkhead at the bottom region of the bulkhead; and means in compression extending from each of said sway brace pads to said bulkhead at the bottom region of the bulkhead.

9. A jettisonable fuel tank as set forth in claim 8 in which said bulkhead includes a vertical diametrical compression member to receive the ejective force.

10. A jettisonable fuel tank as set forth in claim 8 in which said bulkhead includes two spaced thin sheets spanning said shell and includes a honeycomb structure sandwiched between said two sheets to keep the two sheets from buckling.

11. In a jettisonable fuel tank for releasable anti-sway attachment to an aircraft at two longitudinally spaced points on the tank and for separation from the aircraft by ejective force applied to the tank at a third point intermediate said two points, the combination of: two tank shells meeting end to end in the region of said third point; an internal reinforcement ring telescoped into the meeting ends of said two shells and connected thereto to join the two shells together; a pair of thin spaced transverse sheets spanning said ring member and connected thereto; a honeycomb structure sandwiched between said two sheets to brace the sheets, said ring member, two sheets and honeycomb structure comprising a bulkhead assembly; a mounting means for the tank on the top side of each of said two shells at said two points respectively; diagonal tension means inside each of said two shells connecting the corresponding mounting means to the bottom portion of said bulkhead assembly to distribute forces from said mounting means to said two shells; a pair of circumferentially spaced sway brace pads on the top side of each of said two shells; and diagonal compression means inside each of said shells extending from the corresponding pair of sway brace pads to the bottom portion of said bulkhead structure.

12. The combination as set forth in claim 11 in which said bulkhead assembly includes a vertical compression member spanning said reinforcement ring between said two spaced sheets to receive the ejective force applied at said third point.

References Cited in the file of this patent

UNITED STATES PATENTS

| | | |
|---|---|---|
| 167,262 | Lewis | Aug. 31, 1875 |
| 1,313,387 | Kaarbo | Aug. 19, 1919 |
| 2,056,563 | Budd et al. | Oct. 6, 1936 |
| 2,113,692 | Hughes et al. | Apr. 12, 1938 |
| 2,415,032 | Edgar et al. | Jan. 28, 1947 |
| 2,525,251 | Willard | Oct. 10, 1950 |
| 2,541,371 | Kops | Feb. 13, 1951 |
| 2,552,119 | Scharenberg | May 8, 1951 |
| 2,596,139 | Fletcher | May 13, 1952 |
| 2,596,839 | Clausen | May 13, 1952 |
| 2,644,777 | Haven | July 7, 1953 |